United States Patent [19]

Gardiner

[11] Patent Number: 5,031,353
[45] Date of Patent: Jul. 16, 1991

[54] DOMINATOR WIRE

[76] Inventor: James T. Gardiner, 101 Convention Center Dr., Ste. 200, Las Vegas, Nev. 89109

[21] Appl. No.: 573,343

[22] Filed: Aug. 24, 1990

Related U.S. Application Data

[63] Continuation-in-part of Ser. No. 399,962, Aug. 29, 1989, abandoned.

[51] Int. Cl.$^5$ ............................................. A01M 29/00
[52] U.S. Cl. ........................................................ 43/98
[58] Field of Search ............................. 43/58, 98, 112

[56] References Cited

U.S. PATENT DOCUMENTS

| 817,448 | 4/1906 | Shanahan | 43/98 |
|---|---|---|---|
| 2,588,894 | 3/1952 | Taff | 43/98 |
| 4,862,637 | 9/1989 | Pressel | 43/98 |

Primary Examiner—Kurt Rowan
Attorney, Agent, or Firm—Quirk, Tratos & Roethel

[57] ABSTRACT

A dominator wire comprises a plurality of braided strands forming a continous wire. Each separate strand is supplied with an electrical current that is different than the electrical current that is supplied to each of the other strands. A plurality of insulating disks are disposed in spaced relationship a predetermined distance apart along the length of the wire creating discrete wire segments. The spaced distance is selected so that a bird that lands on the wire cannot put both of its feet on the wire between the same two insulating disks. Each wire segment has a single exposed metal conductor segment. When the bird alights on the wire, each foot will contact a different metal conductor segment thereby causing a current to flow through the body of the bird causing the bird to be stunned or killed.

21 Claims, 2 Drawing Sheets

DOMINATOR WIRE

CROSS-REFERENCE TO RELATED APPLICATION

This application is a continuation-in-part of application Ser. No. 07/399,962, filed Aug. 29, 1989 now abandoned.

BACKGROUND OF THE INVENTION

This invention relates to a dominator wire, and more particularly to a dominator wire used to repel or kill birds from the area of buildings, airports, feedlots or other structures or environs where the presence of birds would be a nuisance.

In many situations, the presence of birds is a particular problem. The birds interfere with the proper functioning of heating and cooling systems in commercial and residential buildings. Birds build nests or otherwise take up residence in houses, buildings and appurtenant structures. The natural wastes associated with the birds is not compatible with machinery or equipment for both health and aesthetic reasons. In agricultural areas, birds can cause considerable damage to livestock feed and other foodstuffs by either eating them or by spoiling them with bird wastes. The presence of birds in the area of airports is also becoming an increasing problem. They pose a very real danger at both commercial and military facilities. The birds are often drawn into the intake of jet engines causing malfunctions and the potential loss of human life. The impact of birds into the body of a plane can cause structural problems, and even routine dents still require considerable repair costs.

There have been proposals over the years to attempt to solve this problem. A typical solution is shown in U.S. Pat. No. 4,299,048 to Bayes and involves using electrified wires strung in the area to impart electrical shock to birds that may roost on the wires. Bayes shows an overhead cable that carries two exposed wires arranged parallel along opposite sides of the cable. When a bird lands on the wire, the bird's foot spans the two exposed wires and the bird receives a shock from contacting the exposed wires. In the Bayes' configuration, however, the current will flow along the path of least resistance which is simply from the front of the bird's foot to the back of the bird's foot. The electric shock is not transmitted through the body of the bird where the bird's vital organs are. the full effect of the electric shock is not imparted to the bird. A similar device is disclosed in U.S. Pat. No. 3,366,854 to Robinson.

U.S. Pat. No. 3,294,893 to Shaffer shows another wire device for controlling bird nuisance. This patent discloses a cable having two parallel wires separated by an insulating member, but in this device, the wires are only exposed at particular locations or points along the cable. Thus the effectiveness of this device is entirely dependent on where the bird happens to land.

It is an object of the present invention to provide an electrical dominator wire that imparts an electrical shock up one leg through the body and down the other leg of the bird when the bird lands on the wire. This causes the current to flow through the body of the bird imparting an electrical shock to the bird's vital organs which is much more effective in dissuading the bird from remaining on the wire. The amount of current can be regulated to either impart a light shock to simply stun the bird or, if desired, a heavier shock to kill the bird.

It is a feature of the present invention that a electrical dominator wire is provided that comprises short individual segments of exposed metal conductors of differing voltages and currents along the longitudinal axis of the wire so that when a bird lands on the wire, each foot of the bird will be touching an exposed segment of different voltage and current so that the bird will receive a shock of electricity through the bird's body.

It is an advantage of the present invention that a bird landing on the electrical dominator wire will be stunned or killed by an electrical shock effected by the differing currents regardless of the location on the wire that the bird lands.

SUMMARY OF THE INVENTION

The present invention comprises an electrical dominator wire that has a plurality of individual strands arranged in a braided configuration. Each individual strand carries a particular voltage and current, which is a different voltage and current than is carried by each of the other strands. A series of insulator disks are spaced along the length of the dominator wire, which serve to separate the exposed segments of each wire, in a closely and evenly spaced relationship. Between each disk only one strand of wire has an exposed metal conductor segment. Because of the distance between each insulator disk, only one of the bird's feet can fit between the disks at one time. The bird cannot land on the dominator wire without having each of the bird's feet come to rest between different disks and therefore on different exposed segments of the wire. The bird receives a shock in an amount sufficient to either stun or kill the bird due to the difference in voltages and currents between the exposed metal conductors on the different segments of the wire upon which the bird's feet land.

In an alternate embodiment of the present invention, a series of metal conductive plates are disposed, one each between each insulator disk, around the plurality of individual strands of the wire. Each plate has a plurality of spikes that pierce through the insulating layer of an individual strand and provide an electrical charge to the plate. When a bird lands on the wire, each of the bird's feet comes into contact with a different metal plate thereby sending an electrical shock through the bird's body.

DETAILED DESCRIPTION OF THE PREFERRED EMBODIMENTS

Figure 1:
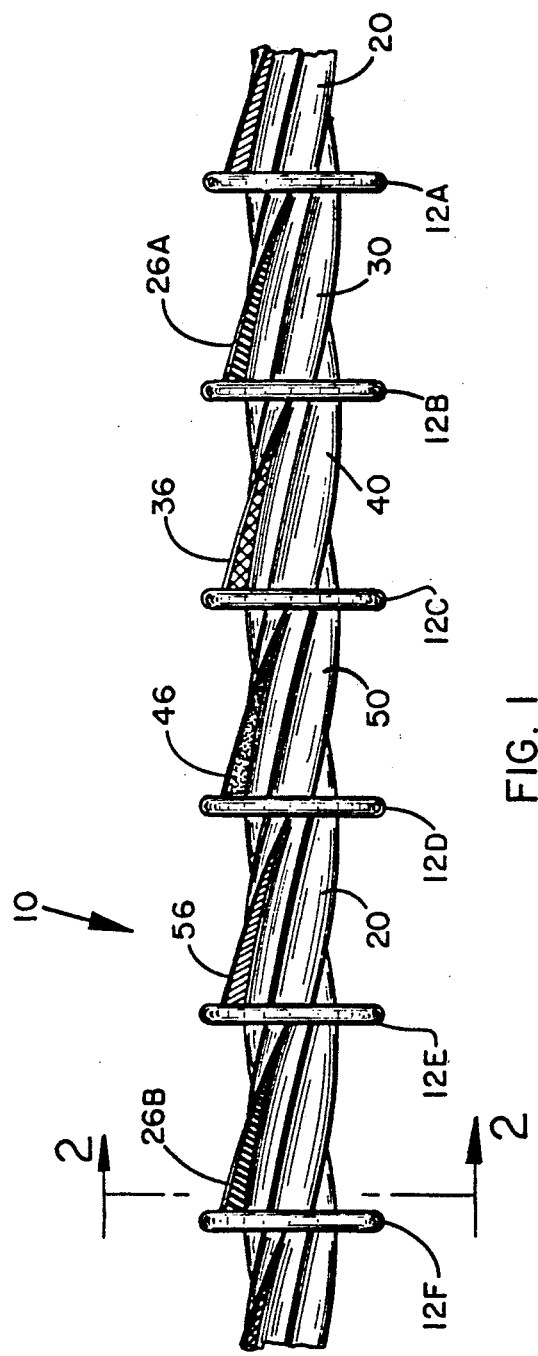
FIG. 1 is a plan view of the dominator wire of the present invention.
Figure 2:
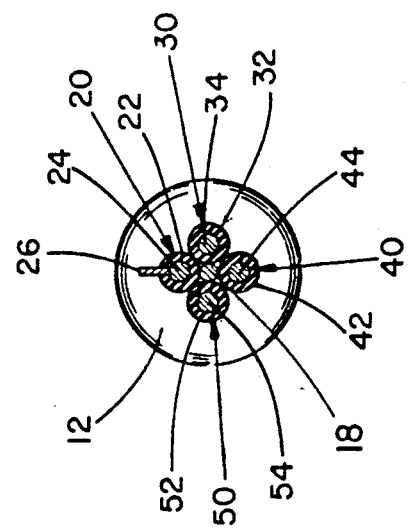
FIG. 2 is a cross-section of the dominator wire of the present invention taken along line 2—2 of FIG. 1.

The dominator wire of the present invention is shown generally at 10 in the plan view of FIG. 1. The dominator wire 10 comprises a plurality of strands 20, 30, 40 and 50. While the number of strands used to make up the wire are not critical, in the preferred embodiment, four strands are used. Each strand has the same configuration. For example, first strand 20 has an outer insulation layer 22 and an inner conducting core 24 as shown in FIG. 2. Similarly, second strand 30 has an outer insulation layer 32 and an inner conducting core 34. Again, third strand 40 has an outer insulation layer 42 and an inner conducting core 44. Finally, fourth strand 40 has an outer insulation layer 42 and an inner conducting core 44.

The plurality of strands are arranged in a braided or twisted configuration as shown in FIG. 1. This braided or twisted configuration enhances the flexibility and strength of the wire. It is often necessary to orient the wire around obstacles or to have the wire turn corners or pass over or under objects. The braided or twisted configuration of the wire allows for about any orientation desired due to the flexibility that a braided or twisted design imparts to the wire.

Insulating disks 12 are provided at selected, evenly spaced locations along the wire 10. The distance between each disk 12 is selected so that a bird will not be able to get both of its feet on the wire 10 between two adjacent disks 12. The disks also serve the additional function of assisting in holding the strands of the wire together.

Between any two of the disks 12, one of the strands is provided with an exposed metal conductor segment. For example, between disk 12A and disk 12B, the strand 20 has an exposed metal conductor segment 26A that extends through the insulation layer 22 and is in electrical contact with the inner conducting core 24. The conductor segment 26A is exposed along the surface of the strand 20 for the entire length of the strand 20 between the disk 12A and the disk 12B.

Between the next two disks, 12B and 12C, the strand 30 has an exposed metal conductor segment 36 which similarly extends through the surface of the insulation layer 32 and is in electrical contact with the conducting core 34. Between disks 12C and 12D, the strand 40 has an exposed metal conducting segment 46 that extends through the surface of the insulation layer 42 and is in electrical contact with the conducting core 44. Between disks 12D and 12E, the strand 50 has an exposed metal conducting segment 56 that extends through the surface of the insulation layer 52 and is in electrical contact with the conducting core 54. Finally, between disks 12E and 12F, the first strand 20 has rotated back to the top of the wire 10 and another exposed metal conductor segment 26B extends through the surface of the insulation layer 22. This pattern repeats itself throughout the entire length of the wire 10.

In a preferred embodiment of this invention, the metal conductor segments are exposed on the top of the wire 10 as the wire is oriented with respect to the surface over which the wire is strung. Having the exposed metal conductor segments on the top of the wire 10 mitigates the possibility that a bird can land on the wire 10 without physically contacting an exposed metal conductor segment.

Figure 3:
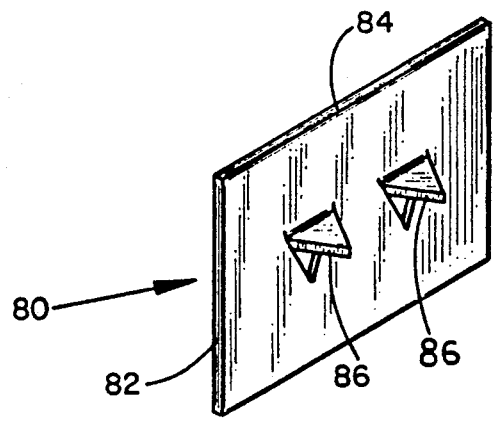
FIG. 3 shows a metal conductive segment used in an alternative embodiment of the present invention.

FIG. 3 shows another preferred embodiment of the present invention. A flexible metal plate 80 is designed to be disposed around the plurality of strands 20, 30, 40, 50. The plate 80 has a width 84 approximately equal to the distance between adjacent insulating disks 12. The plate 80 has length 82 just slightly less than the circumference around the plurality of strands. Alternatively, the plate could be provided with a length slightly greater that the circumference around the plurality of strands. In this alternative version, the plate when it is formed around the strands will slightly overlap to provide assistance in holding the plurality of strands together as well as locking the plate to the plurality of strands.

In order to additionally secure the plate 80 to the strands, the overlocking portions of the plate 80 could be interlocked. This interlocking could be effected by crimping the overlapping portions together. Alternatively, the overlapping portions of the plate could be provided with preformed sections or segments that interlock or there could be preformed elements on the edges of the overlapping portions that interfit to held the edges of the plate together.

The plate has two electrically conductive prongs 86 that extend from the surface of the plate 80. These prongs 86 are preferably formed integrally with the surface of the plate 80 when the plate 80 is fabricated to ensure that electrical contact will be present from the plate 80 into the prongs 86. Each prong 86 is preferably formed in a triangular shape with a relatively sharp point to permit the prong to penetrate through the insulating cover disposed around the strand and into the conducting core on the inside of the strand.

Figure 4:
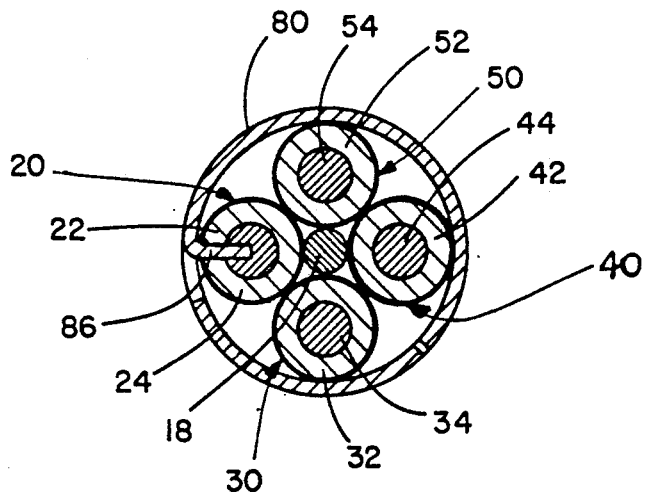
FIG. 4 shows in cross-section the metal conductive segment attached to the wire of the alternative embodiment of the present invention.
Figure 5:
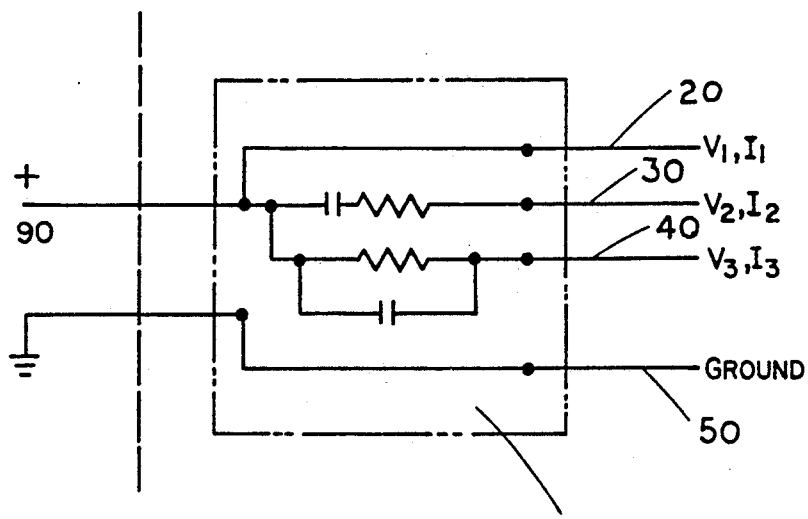
FIG. 5 shows an electrical schematic of a preferred circuit that can be used to apply the various electrical voltages and currents to the individual strands of the wire of the present invention.

As shown in FIG. 4, the plate 80 is bent around the plurality of strands 20, 30, 40 and 50 between two insulating disks, for example, insulating disks 12A and 12B. The plate 80 forms a band around the plurality of strands. This provides a large contact area for the bird's foot when the bird lands and grasps onto the wire 10. As shown in FIG. 4, the prongs 86 penetrate the insulating cover 22 on the strand 20 so that electrical contact is achieved with the current flowing through the conducting core 24 of the strand 20. Between an adjacent two insulating disks, for example, insulating disks 12B and 12C, the prongs 86 of the plate 80 would extend through the insulating cover 32 into the conducting core 34 of the strand 30. This pattern would repeat itself along the entire length of the wire 10. Because each conducting core 24, 34, 44 and 54 carries a different voltage and current, a bird landing on the wire would receive a shock through its body from the coming into contact with the metal plates 80. This circuit shown in FIG. 5 is representative of a typical circuit that can be used to practice the present invention. Alternatively, other circuits could be used as would be apparent to a person skilled in the art.

In each embodiment of the present invention, as shown in FIG. 5, the wires 20, 30, 40 and 50 are connected through a circuit 100 to a power supply 90 that provides each of the strands with a voltage and current that is different from the voltage and current that is supplied to each of the other strands.

In the preferred embodiment, strand 20 is provided with a voltage, $V_1$ and a current, $I_1$. Strand 30 is provided with a voltage, $V_2$ and a current, $I_2$ where $V_2 = 2V_1$ and $I_2 = 2I_1$. Strand 40 is provided with a voltage, $V_3$ and a current, $I_3$ where $V_3 = 3V_1$ and $I_3 = 3I_1$. Finally, strand 50 is the ground wire and has a zero voltage and a zero current.

The configuration of the present invention allows for numerous alternative power supplies. The power supply can be either a continuous direct or alternating current source or a chopped/interrupted direct or alternating current source. The circuitry to obtain these various modes of operation may have inductors, resistors, capacitors and phasing devices to produce leading or lagging power factors, or voltages/currents having limiting or out-of-phase characteristics.

The functioning of this wire will necessarily follow the standard natural laws and formulas governing electrical conductivity. Discussions presented herewith will deal with current delivered between the bird's feet when the bird alights on the wire with each foot landing on a separate wire segment defined by the insulating disks. A person of skill in the art will realize, according to the formula $I=V/R$ (where I is the current measured in amps, V is the voltage measured in volts and R is the resistance measured in ohms), that for a stated current both the voltage and the resistance can vary under different operating conditions and still deliver the same current.

In order to simply repel or scare a bird away without killing it, the bird needs to receive between its feet a current of generally between 1 and 3 milliamps. This level of current will be just above the threshold level for the bird to perceive a shock from the current.

At a current of approximately 5-10 milliamps, the muscles in the bird's foot will begin to lock up which may prevent the bird from letting go of the wire. Therefore, it is recommended that the current be kept at a level below approximately 5 milliamps if it desired to simply repel the birds away from the wire by only shocking or stunning them.

In order to kill a bird which alights on a wire, a higher level of current can be employed. The current delivered between the feet of the bird needs to be in the range of approximately 60 to 250 milliamps, which will be sufficient to kill most small birds. Currents in the range of approximately 250 milliamps to 3 amps will be sufficient to kill most any sized birds, but currents this high pose a potential threat to humans which is generally desired to be avoided. These higher currents would certainly be effective but should only be used in areas in which human contact with the wire is not anticipated.

The use of chopped direct current would also assist in having the killed birds drop off of the wire since stopping and starting the power would stop the normal muscle contractions that occur at death.

As an optional feature of the present invention, a nonconducting filler wire or cord 18 can be provided in the interior of the twisted or braided strands. This filler wire or cord 18 provides internal support and longitudinal strength to the wire 10 and also assists in maintaining the insulation between the various strands that make up the wire 10.

In use, the dominator wire 10 of the present invention works in the following manner. The wire 10 is strung or otherwise arrayed in the area around the house, building, airport or other location where birds have become pests and their removal or discouragement is desired. The dominator wire 10 is connected to an appropriate power supply that will energize the individual strands of the dominator wire 10 in the manner described above. When a bird lands on the dominator wire 10, the spacing of the insulator disks 12 will cause each of the bird's feet to alight on a different exposed metal conductor segment. Because of the current differences between each segment, current will flow from one foot of the bird, up the bird's leg, through the body of the bird, down the other leg and out the other foot. This current flow will shock or kill the bird, thus accomplishing the desired result of discouraging the presence of the bird in the area in which the dominator wire 10 is utilized.

The spacing between the insulating disks 12 should be selected based on the size of the birds it is desired to dominate. The larger the bird, the larger the space between each disk in order to accommodate the size of the bird's foot. Smaller birds will require smaller spacing to prevent the bird from getting both of its feet between the same two adjacent disks.

The dominator wire of the present invention can also be used in a near to the ground environment. Often grain is simply stored in a pile on the ground as a temporary measure. The dominator wire can be disposed around the grain pile to inhibit rodents or other ground pests from invading the grain pile. The diameter of the insulating disks can be selected so that the insulating disks will keep the strands of the wire suspended above the ground level to prevent the wire from being shorted out by the ground.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A dominator wire comprising:
   (a) a plurality of electrically conductive strands braided together to form a continuous wire,
   (b) each strand being provided with a current that is different from the current provided to any of the other strands,
   (c) a plurality of insulator disks disposed circumferentially about said strands and spaced a predetermined distance apart creating individual wire portions between each pair of disks,
   (d) an exposed metal conductor segment associated with each strand and disposed along each wire portion, and
   (e) each wire portion having only one of said metal conductor segments.

2. The dominator wire as defined in claim 1 wherein each electrically conductive strand comprises a central conducting core and an outer insulation layer.

3. The dominator wire as defined in claim 2 wherein each exposed metal conductive segment comprises a thin metal strip which extends through the insulation layer and is joined in electrical contact with the conducting core.

4. The dominator wire as defined in claim 2 wherein each exposed metal conductive segment comprises a metal plate disposed around the plurality of strands, each metal plate including at least one electrical prong that penetrates through the insulation layer and into electrical contact with the conducting core.

5. The dominator wire as defined in claim 1 wherein the number of strands is four.

6. The dominator wire as defined in claim 5 wherein the first strand has a current of $I_1$, the second strand has a current of $2I_1$, the third strand has a current of $3I_1$ and the fourth strand is the ground wire and has a current of zero.

7. The dominator wire as defined in claim 5 wherein the current $I_1$ is in the range of generally between 2 and 3 milliamps.

8. The dominator wire as defined in claim 5 wherein the current $I_1$ is generally at least 250 milliamps.

9. The dominator wire as defined in claim 1 wherein a non-conducting filler wire is disposed centrally within the braided strands.

10. The dominator wire as defined in claim 1 wherein said insulator disks are spaced apart a distance such that a bird cannot land on the wire with both of its feet between two adjacent insulator disks.

11. The dominator wire as defined in claim 1 wherein each exposed metal conductor segment is oriented on the top of the strand.

12. A dominator wire comprising:
   (a) a plurality of electrically conductive strands braided together to form a continuous wire, each strand comprising a central conductive core and an outer insulation layer,
   (b) each strand being provided with a current that is different from the current provided to any of the other strands,
   (c) a plurality of insulator disks disposed circumferentially about said strands and spaced a predetermined distance apart creating individual wire portions between each pair of disks,
   (d) an exposed metal conductor segment associated with each strand and disposed along each wire portion, and
   (e) each wire portion having only one of said metal conductor segments.

13. The dominator wire as defined in claim 12 wherein each exposed metal conductive segment comprises a thin metal strip which extends through the insulation layer and is joined in electrical contact with the conducting core.

14. The dominator wire as defined in claim 13 wherein each exposed metal conductive segment comprises a metal plate disposed around the plurality of strands, each metal plate including at least one electrical prong that penetrates through the insulation layer and into electrical contact with the conducting core.

15. The dominator wire as defined in claim 12 wherein the number of strands is four.

16. The dominator wire as defined in claim 15 wherein the first strand has a current of $I_1$, the second strand has a current of $2I_1$, the third strand has a current of $3I_1$ and the fourth strand is the ground wire and has a current of zero.

17. The dominator wire as defined in claim 15 wherein the current $I_1$ is in the range of generally between 2 and 3 milliamps.

18. The dominator wire as defined in claim 15 wherein the current $I_1$ is generally at least 250 milliamps.

19. The dominator wire as defined in claim 12 wherein a non-conducting filler wire is disposed centrally within the braided strands.

20. The dominator wire as defined in claim 12 wherein said insulator disks are spaced apart a distance such that a bird cannot land on the wire with both of its feet between two adjacent insulator disks.

21. The dominator wire as defined in claim 12 wherein each exposed metal conductor segment is oriented on the top of the strand.

* * * * *